(12) United States Patent
Shimozawa

(10) Patent No.: US 10,451,173 B2
(45) Date of Patent: Oct. 22, 2019

(54) CONTROL DEVICE FOR DUAL-CLUTCH TRANSMISSION

(71) Applicant: ISUZU MOTORS LIMITED, Shinagawa-ku, Tokyo (JP)

(72) Inventor: Tomoaki Shimozawa, Fujisawa (JP)

(73) Assignee: ISUZU MOTORS LIMITED, Shinagawa-Ku, Tokyo (JP)

( * ) Notice: Subject to any disclaimer, the term of this patent is extended or adjusted under 35 U.S.C. 154(b) by 0 days.

(21) Appl. No.: 15/779,473

(22) PCT Filed: Nov. 22, 2016

(86) PCT No.: PCT/JP2016/084531
§ 371 (c)(1),
(2) Date: May 25, 2018

(87) PCT Pub. No.: WO2017/090580
PCT Pub. Date: Jun. 1, 2017

(65) Prior Publication Data
US 2018/0335129 A1 Nov. 22, 2018

(30) Foreign Application Priority Data
Nov. 26, 2015 (JP) ................................ 2015-231067

(51) Int. Cl.
*F16H 61/688* (2006.01)
*F16H 57/04* (2010.01)
(Continued)

(52) U.S. Cl.
CPC ......... *F16H 57/0473* (2013.01); *F16D 13/72* (2013.01); *F16D 13/74* (2013.01);
(Continued)

(58) Field of Classification Search
None
See application file for complete search history.

(56) References Cited

U.S. PATENT DOCUMENTS

2004/0112171 A1* 6/2004 Kuhstrebe ............. B60K 6/547
74/730.1
2007/0144284 A1 6/2007 Mitsubori et al.
(Continued)

FOREIGN PATENT DOCUMENTS

CN 1991217 A 7/2007
CN 101761612 A 6/2010
(Continued)

OTHER PUBLICATIONS

International Search Report and Written Opinion for related International Application No. PCT/JP2016/084531, dated Feb. 28, 2017; English translation of ISR provided; 8 pages.
(Continued)

*Primary Examiner* — Justin Holmes
(74) *Attorney, Agent, or Firm* — Procopio, Cory, Hargreaves & Savitch LLP

(57) ABSTRACT

Provided is a shifting control device having a shifting control unit configured to, in a case where, when upshifting which involves switching of a clutch and changing of a shift main gear is performed, a number of revolutions of an input shaft connected to a to-be-engaged clutch is higher than a number of revolutions of the engine, or a case where, when downshifting which involves the switching of the clutch and the changing of the shift main gear is performed, the number of revolutions of the input shaft connected to the to-be-engaged clutch is lower than the number of revolutions of the engine, increase an amount of an hydraulic oil to a maximum lubrication amount during a period of time from when gear disconnecting is completed until the number of revolutions of the input shaft becomes equal to the number of revolutions of the engine.

5 Claims, 4 Drawing Sheets

(51) Int. Cl.
*F16D 13/72* (2006.01)
*F16D 13/74* (2006.01)
*F16D 21/06* (2006.01)
*F16H 61/04* (2006.01)
*F16H 59/42* (2006.01)
*F16H 59/46* (2006.01)
*F16H 3/00* (2006.01)

(52) U.S. Cl.
CPC ......... F16D 21/06 (2013.01); F16H 61/0403 (2013.01); F16H 61/688 (2013.01); *F16H 3/006* (2013.01); *F16H 59/42* (2013.01); *F16H 59/46* (2013.01)

(56) References Cited

U.S. PATENT DOCUMENTS

2007/0175720 A1   8/2007   Yoshida et al.
2012/0322603 A1*  12/2012  Kuroda .................... B60K 6/48
                                                            475/5
2014/0195131 A1*  7/2014   Porto ..................... F16H 61/688
                                                            701/60

FOREIGN PATENT DOCUMENTS

| CN | 101970901 A | 2/2011 |
| EP | 2243983 A2 | 10/2010 |
| EP | 2256369 A1 | 12/2010 |
| JP | 2007-198514 A | 8/2007 |
| JP | 2010-121699 A | 6/2010 |
| JP | 2015-048932 A | 3/2015 |

OTHER PUBLICATIONS

First Office Action for related CN App No. 201680069201.4 dated Apr. 2, 2019, 14 pgs.

* cited by examiner

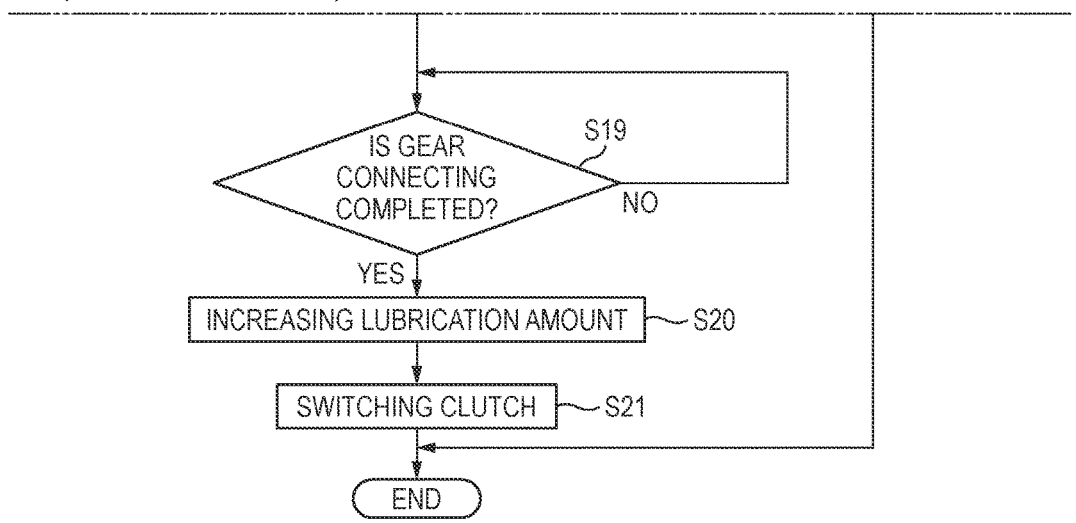

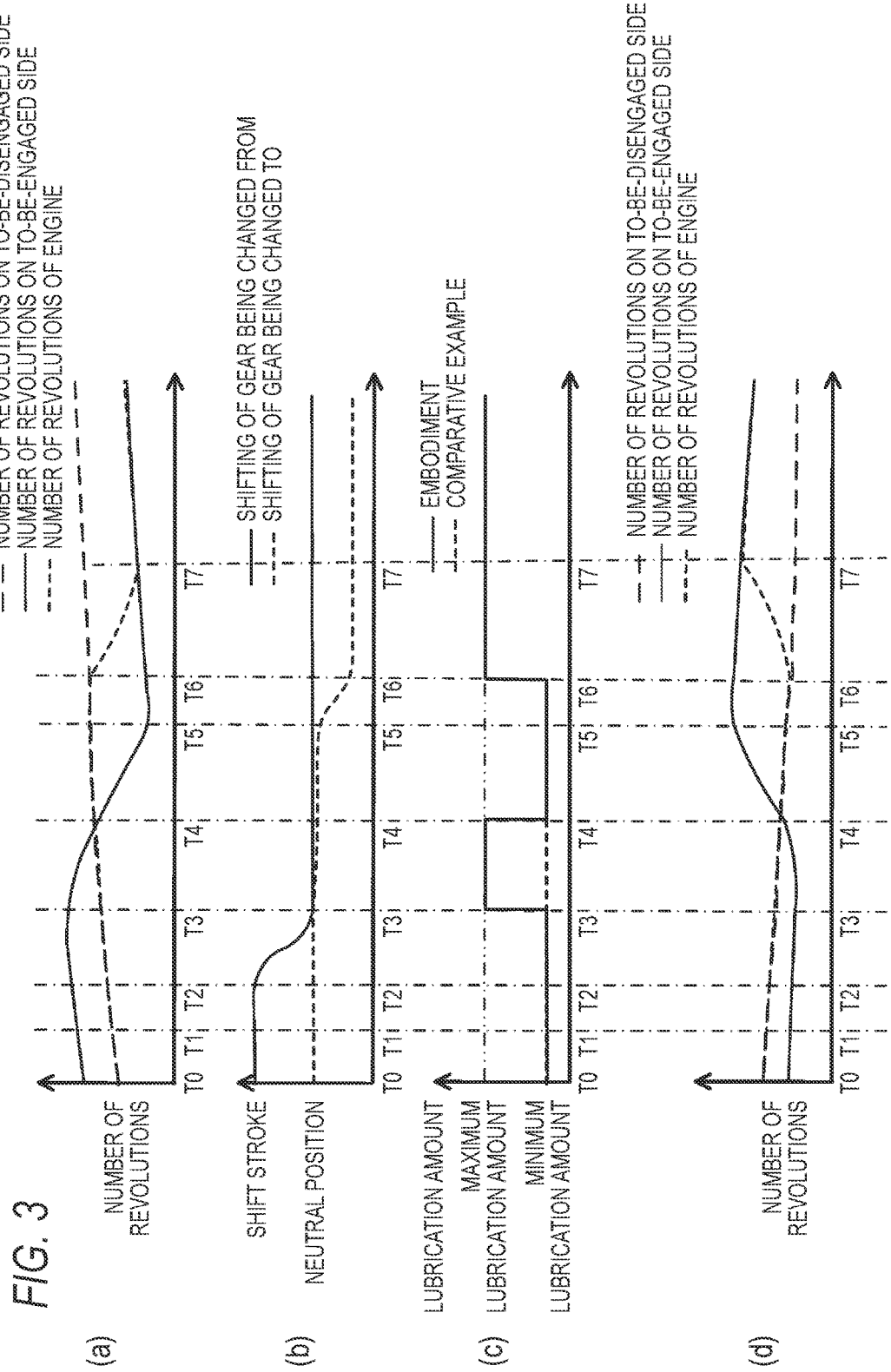

CONTROL DEVICE FOR DUAL-CLUTCH TRANSMISSION

CROSS-REFERENCE TO RELATED APPLICATIONS

This application is a U.S. National Stage entry of PCT Application No: PCT/JP2016/084531 filed Nov. 22, 2016, which claims priority to Japanese Patent Application No. 2015-231067, filed Nov. 26, 2015, the contents of which are incorporated herein by reference.

TECHNICAL FIELD

The present disclosure relates to a control device for a dual-clutch transmission, in which a clutch device including two clutches is provided between a driving source and a transmission mechanism, a driving power transmission path from the driving source to a vehicle drive system is switched between transmission lines, each of which is formed via one of the clutches, and also shift gears usable in the respective transmission lines are different from each other.

BACKGROUND ART

Conventionally, a dual-clutch device is known, in which two clutches capable of connecting and disconnecting a driving power transmission from a driving source, such as an engine, by means of a pressure of a hydraulic oil are provided therein and also a driving power transmission path from the driving source to a transmission is switched between transmission lines, each of which is formed via one of the clutches.

Engaging and disengaging of each of the clutches of such a dual-clutch device are controlled by adjusting an amount or pressure of the hydraulic oil to be supplied to each of the clutches.

In addition, a dual-clutch device is also known, in which a hydraulic oil is supplied to a space around clutch plates of each of clutches in order to discharge a frictional heat generated by the clutch plates of each of the clutches.

In such a dual-clutch device, if the hydraulic oil is supplied to the space around the clutch plates, there is an advantage that heat generated in the clutch plates can be discharged, but there is also a disadvantage that a drag torque is generated in the clutch plates by the hydraulic oil, thereby causing deterioration of fuel consumption.

For example, for an automatic transmission, a technique is known, in which a flow rate of a lubricating oil is corrected on the basis of a generated drag torque, thereby adjusting the drag torque (e.g., see Patent Document 1).

PRIOR ART REFERENCE

Patent Document

Patent Document 1: JP-A-2007-198514

DISCLOSURE OF THE INVENTION

Problems to be Solved

As described above, although there are an advantage and a disadvantage of supplying the hydraulic oil to the space around the clutch plates, it is requested to allow the hydraulic oil to be used more profitably.

Accordingly, an object of the present disclosure is to provide a technique in which a hydraulic oil used for cooling clutch plates can be used more profitably.

Means for Solving the Problems

In order to achieve the above object, one aspect of the present disclosure is a control device for a dual-clutch transmission in which a clutch device including a first clutch and a second clutch is provided between a driving source and a transmission mechanism, a driving power transmission path from the driving source to a vehicle drive system is capable of being switched between a first transmission line via the first clutch and a second transmission line via the second clutch, and shift gears usable in the first transmission line are different from shift gears usable in the second transmission line, wherein a first space, which is provided around first clutch plates for engaging and disengaging the first clutch, and a second space, which is provided around second clutch plates for engaging and disengaging the second clutch, are communicated with each other and are configured to allow a hydraulic oil for cooling to be supplied thereto, the control device including: gear changing control means configured to, when shifting which involves switching between the first transmission line and the second transmission line and changing of shift gears used in a switching transmission line being switched to is performed, perform changing of the shift gear used in the switching transmission line being switched to, if a clutch of a switching transmission line being switched from is in an engaged state and also a clutch of the switching transmission line being switched to is in a disengaged state; and lubrication control means configured to, in at least one of: (i) a case where, when upshifting which involves switching between the first transmission line and the second transmission line and changing of the shift gear used in the switching transmission line being switched to is performed, a number of revolutions of an input shaft connected to a to-be-engaged clutch, which is the clutch of the switching transmission line being switched to, is higher than a number of revolutions of the driving source before the upshifting is performed; or (ii) a case where, when downshifting which involves the switching between the first transmission line and the second transmission line and the changing of the shift gear used in the switching transmission line being switched to is performed, the number of revolutions of the input shaft connected to the to-be-engaged clutch is lower than the number of revolutions of the driving source before the downshifting is performed, increase an amount of the hydraulic oil, which is to be supplied to the first space and the second space, to a second lubrication amount larger than a predetermined first lubrication amount during at least a part of a period of time from when gear disconnecting of a shift gear before being changed is completed until the number of revolutions of the input shaft becomes equal to the number of revolutions of the driving source.

In the control device for the dual-clutch transmission, the lubrication control means may be configured to adjust the amount of the hydraulic oil, which is to be supplied to the first space and the second space, to the first lubrication amount during a period of time from when the number of revolutions of the input shaft becomes equal to the number of revolutions of the driving source until gear connecting of a shift gear being changed to is completed.

Also, in the control device for the dual-clutch transmission, in at least one of: (i) the case where, when the upshifting which involves switching between the first transmission line and the second transmission line and changing of the shift gear used in the switching transmission line being switched to is performed, the number of revolutions of the input shaft connected to the to-be-engaged clutch, which is the clutch of the switching transmission line being switched to, is higher than the number of revolutions of the driving source before the upshifting is performed, or (ii) the case where, when the downshifting which involves the switching between the first transmission line and the second transmission line and the changing of the shift gear used in the switching transmission line being switched to is performed, the number of revolutions of the input shaft connected to the to-be-engaged clutch is lower than the number of revolutions of the driving source before the downshifting is performed, the lubrication control means may be configured to increase the amount of the hydraulic oil, which is to be supplied to the first space and the second space, to the second lubrication amount during the period of time from when the gear disconnecting of the shift gear before being changed is completed until the number of revolutions of the input shaft becomes equal to the number of revolutions of the driving source.

Further, in the control device for the dual-clutch transmission, when the gear connecting of the shift gear being changed to is completed, the lubrication control means may be configured to adjust the amount of the hydraulic oil, which is to be supplied to the first space and the second space, to a maximum lubrication amount.

Also, in the control device for the dual-clutch transmission, the first lubrication amount may be a minimum lubrication amount to be supplied to the first space and the second space, and the second lubrication amount may be a maximum lubrication amount to be supplied to the first space and the second space.

Advantageous Effects of Invention

According to the present disclosure, a hydraulic oil used for cooling clutch plates can be used more profitably.

BRIEF DESCRIPTION OF DRAWINGS

In FIG. 3, (a) is a view showing a change in a number of revolutions of an input shaft and the number of revolutions of an engine when upshifting is performed; (b) is a view showing a change in shift stroke; (c) is a view showing a change in amount of hydraulic oil (lubrication amount) supplied to a space around clutch plates; and (d) is a view showing a change in a number of revolutions of the input shaft and a number of revolutions of the engine when downshifting is performed.

MODE FOR CARRYING OUT THE INVENTION

Figure 1:
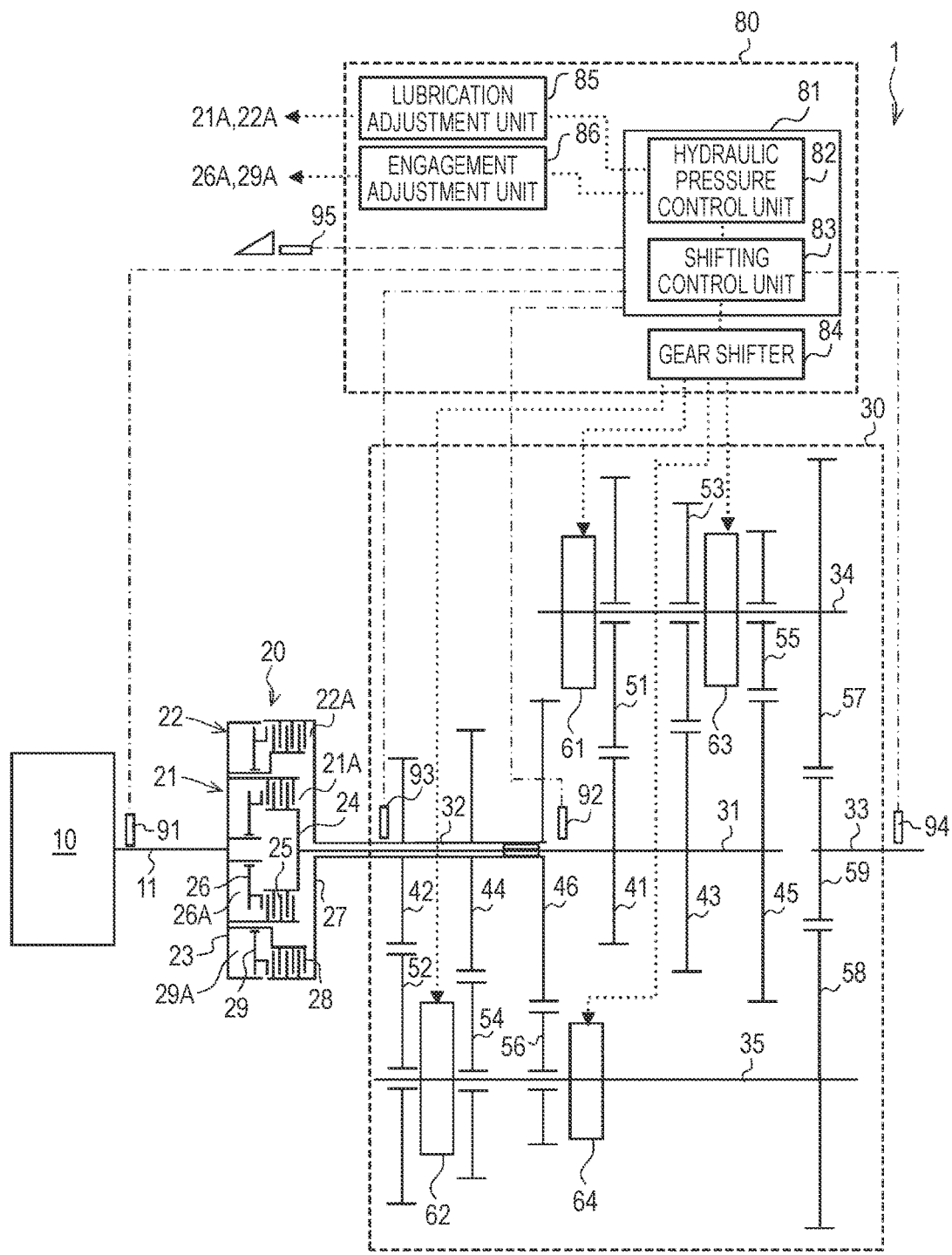
FIG. 1 is a schematic configuration diagram showing a dual-clutch transmission having a dual-clutch device according to one embodiment of the present disclosure.

Hereinafter, a shifting control device, which is an example of a control device for a dual-clutch transmission according to one embodiment of the present disclosure, will be described with reference to the accompanying drawings. The same components are designated by the same reference numerals, and names and functions thereof are the same. Therefore, the detailed description thereof will be not repeated.

FIG. 1 is a schematic configuration diagram showing a dual-clutch transmission having a dual-clutch device according to one embodiment of the present disclosure.

The dual-clutch transmission 1 is connected to an output shaft 11 of an engine 10, which is one example of a driving source.

The dual-clutch transmission 1 includes a dual-clutch device 20 having a first clutch 21 and a second clutch 22; a transmission mechanism 30; a shifting control device 80 as one example of a control device; an engine revolution number sensor 91; a first input shaft revolution number sensor 92; a second input shaft revolution number sensor 93; a vehicle speed sensor 94 (also referred to as an output revolution number sensor); and an accelerator opening rate sensor 95.

The first clutch 21 is, for example, a wet multi-plate clutch and includes a clutch hub 23 configured to integrally rotate with the output shaft 11 of the engine 10; a first clutch drum 24 configured to integrally rotate with a first input shaft 31 of the transmission mechanism 30; a plurality of first clutch plates 25; a first space 21A around the plurality of first clutch plates 25; a first piston 26 for pressing the first clutch plates 25 against each other; and a first hydraulic pressure chamber 26A.

If the first piston 26 is stroked toward an output side (in a right direction in FIG. 1) by a pressure of a hydraulic oil (hydraulic pressure) supplied to the first hydraulic pressure chamber 26A, the first clutch plates 25 are pressed against each other and thus the first clutch 21 becomes an engaged state where the first clutch 21 transmits a torque. On the other hand, if the hydraulic pressure of the first hydraulic pressure chamber 26A is released, the first piston 26 is stroked toward an input side (in a left direction in FIG. 1) by an urging force of a spring (not shown), and thus the first clutch 21 becomes a disengaged state where the first clutch 21 blocks a power transmission. Meanwhile, in the following description, a state where a torque is transmitted via the first clutch plates 25 while the clutch hub 23 and the first clutch drum 24 are rotated at different numbers of revolutions is referred to as a half clutch state of the first clutch 21. In order to discharge a frictional heat generated in the first clutch plates 25 and the like, a hydraulic oil is supplied to the first space 21A by a lubrication adjustment unit 85 as described below.

The second clutch 22 is, for example, a wet multi-plate clutch and includes a clutch hub 23; a second clutch drum 27 configured to integrally rotate with a second input shaft 32 of the transmission mechanism 30; a plurality of second clutch plates 28; a second space 22A around the plurality of second clutch plates 28; a second piston 29 for pressing the second clutch plates 28 against each other; and a second hydraulic pressure chamber 29A.

If the second piston 29 is stroked toward the output side (in the right direction in FIG. 1) by an hydraulic pressure supplied to the second hydraulic pressure chamber 29A, the second clutch plates 28 are pressed against each other and thus the second clutch 22 becomes an engaging state where the second clutch 22 transmits a torque. On the other hand, if the hydraulic pressure is released, the second piston 29 is stroked toward the input side (in the left direction in FIG. 1) by an urging force of a spring (not shown), and thus the second clutch 22 becomes a disengaged state where the second clutch 22 blocks a power transmission. Meanwhile, in the following description, a state where a torque is transmitted via the second clutch plates 28 while the clutch hub 23 and the second clutch drum 27 are rotated at different numbers of revolutions is referred to as a half clutch state of the second clutch 22. In order to discharge a frictional heat occurring in the second clutch plates 28 and the like, a hydraulic oil is supplied to the second space 22A by the lubrication adjustment portion 85 as described below. In the present embodiment, the first space 21A and the second space 22A are communicated with each other. Thus, the hydraulic oil supplied from the lubrication adjustment portion 85 flows in the first space 21A in the same rotation direction as that of the output shaft 11 and then flows in the second space 22A in the same rotation direction as that of the output shaft 11. Thereafter, the hydraulic oil is discharged from the second space 22A.

The transmission mechanism 30 includes first and second input shafts 31, 32; an output shaft 33; and first and second subsidiary shafts 34, 35 arranged parallel to the shafts 31 to 33. The first input shaft 31 is relatively rotatably inserted in a hollow shaft extending through the second input shaft 32 in an axial direction thereof. An output end of the output shaft 33 is connected to a propeller shaft, which is also connected to vehicle driving wheels via a differential gear device and the like (vehicle drive system) (all not shown).

A 1st stage input gear 41, a 3rd stage input gear 43 and a 5th stage input gear 45 are fixed on the first input shaft 31 in this order from the input side. A 2nd stage input gear 42, a 4th stage input gear 44 and a 6th stage input gear 46 are fixed on the second input shaft 32 in this order from the input side. An output main gear 59 is fixed on the output shaft 33.

The first subsidiary shaft 34 is provided thereon with a 1st stage main gear 51 normally engaged with the 1st stage input gear 41; a 3rd stage main gear 53 normally engaged with the 3rd stage input gear 43; a 5th stage main gear 55 normally engaged with the 5th stage input gear 45; and a first output subsidiary gear 57 normally engaged with the output main gear 59 in this order from the input side. The 1st stage main gear 51, the 3rd stage main gear 53 and the 5th stage main gear 55 are provided to be rotatable relative to the first subsidiary shaft 34, and the first output subsidiary gear 57 is provided to be integrally rotatable with the first subsidiary shaft 34.

The second subsidiary shaft 35 is provided thereon with a 2nd stage main gear 52 normally engaged with the 2nd stage input gear 42; a 4th stage main gear 54 normally engaged with the 4th stage input gear 44; a 6th stage main gear 56 normally engaged with the 6th stage input gear 46; a second output subsidiary gear 58 normally engaged with the output main gear 59 in this order from the input side. The 2nd stage main gear 52, the 4th stage main gear 54 and the 6th stage main gear 56 are provided to be rotatable relative to the second subsidiary shaft 35, and the second output subsidiary gear 58 is provided to be integrally rotatable with the second subsidiary shaft 35.

A first synchro mechanism 61, a second synchro mechanism 62, a third synchro mechanism 63 and a fourth synchro mechanism 64 are known structures and include a dog clutch and the like (all not shown).

The first synchro mechanism 61 can cause the first subsidiary shaft 34 and the 1st stage main gear 51 to be engaged (gear connected) with each other. If the first subsidiary shaft 34 and the 1st stage main gear 51 are engaged with each other, the output shaft 33 rotates to correspond to a 1st gear when a driving power from the engine 10 is transmitted to the first subsidiary shaft 34 (when the first clutch 21 is in the engaged state).

The second synchro mechanism 62 can cause the second subsidiary shaft 35 and the 2nd stage main gear 52 to be engaged with each other. If the second subsidiary shaft 35 and the 2nd stage main gear 52 are engaged with each other, the output shaft 33 rotates to correspond to a 2nd gear when a driving power from the engine 10 is transmitted to the second subsidiary shaft 35 (when the second clutch 22 is in the engaged state).

The third synchro mechanism 63 can cause the first subsidiary shaft 34 and the 3rd stage main gear 53 to be engaged with each other and also cause the first subsidiary shaft 34 and the 5th stage main gear 55 to be engaged with each other. If the first subsidiary shaft 34 and the 3rd stage main gear 53 are engaged with each other, the output shaft 33 rotates to correspond to a 3rd gear when a driving power from the engine 10 is transmitted to the first subsidiary shaft 34. Also, if the first subsidiary shaft 34 and the 5th stage main gear 55 are engaged with each other, the output shaft 33 rotates to correspond to a 5th gear when a driving power from the engine 10 is transmitted to the first subsidiary shaft 34.

The fourth synchro mechanism 64 can cause the second subsidiary shaft 35 and the 4th stage main gear 54 to be engaged with each other and also cause the second subsidiary shaft 35 and the 6th stage main gear 56 to be engaged with each other. If the second subsidiary shaft 35 and the 4th stage main gear 54 are engaged with each other, the output shaft 33 rotates to correspond to a 4th gear when a driving power from the engine 10 is transmitted to the second subsidiary shaft 35. Also, if the second subsidiary shaft 35 and the 6th stage main gear 56 are engaged with each other, the output shaft 33 rotates to correspond to a 6th gear when a driving power from the engine 10 is transmitted to the second subsidiary shaft 35.

Operation of the first to fourth synchro mechanisms 61 to 64 is controlled by a shifting control unit 83 as described below and is configured to selectively switch the subsidiary shafts (the first subsidiary shaft 34 and the second subsidiary shaft 35) and the shift main gears (51 to 56) into an engaged state (gear connected state) or a disengaged state (neutral state), depending on an accelerator opening rate detected by the accelerator opening rate sensor 95, a speed detected by the speed sensor 94 and the like. Meanwhile, the number of shift stages (the number of sets of shift input gears (41 to 46) and shift main gears (51 to 56)), the number of synchro mechanisms, the arrangement pattern thereof and the like are not limited to the shown example, but can be appropriately changed without departing from the spirit and scope of the present disclosure.

The transmission mechanism 30 has a first transmission line, in which a driving power is transmitted from the first input shaft 31, which can be connected to the output shaft 11 of the engine 10 via the first clutch 21, to the output shaft 33 via the first subsidiary shaft 34, and a second transmission line, in which a driving power is transmitted from the second input shaft 32, which can be connected to the output shaft 11 of the engine 10 via the second clutch 22, to the output shaft 33 via the second subsidiary shaft 35. In the first transmission line, the driving power is transmitted through odd-numbered stages (1st, 3rd or 5th stage). Also, in the second transmission line, the driving power is transmitted through even-numbered stages (2nd, 6th or 5th stage).

In the dual-clutch transmission (1), when shifting between an odd-numbered stage and an even-numbered stage is performed, transmission of a driving power by a transmission line, which is currently performing transmission of the driving power, is maintained, namely a clutch (to-be-disengaged clutch), which serves for transmitting the driving power to the transmission line, is maintained in the engaged state, and in this state, a shift gear being shifted to in the other transmission line is engaged with a subsidiary shaft in the other transmission line. On the other hand, if the shift gear being shifted to in the other transmission line has been already engaged with the subsidiary shaft, this operation is not performed.

Then, the to-be-disengaged clutch is changed into the disengaged state and also the other clutch (to-be-engaged clutch), which serves for transmitting a driving power to the other transmission line, is changed into the engaged state, thereby performing switching between the clutches to transmit the driving power.

The engine revolution number sensor 91 detects the number of revolutions of the engine 10 and then outputs the number of revolutions to the shifting control device 80. The first input shaft revolution number sensor 92 detects the number of revolutions of the first input shaft 31 and then outputs the number of revolutions to the shifting control device 80. The second input shaft revolution number sensor 93 detects the number of revolutions of the second input shaft 32 and then outputs the number of revolutions to the shifting control device 80. The vehicle speed sensor 94 detects the number of revolutions of the output shaft 33 and then outputs the number of revolutions to the shifting control device 80. A vehicle speed can be specified from the number of revolutions of the output shaft 33. The accelerator opening rate sensor 95 detects an accelerator opening rate and then outputs the accelerator opening rate to the shifting control device 80.

The shifting control device 80 includes a control unit 81, a gear shifter 84, a lubrication adjustment unit 85 and an engagement adjustment unit 86.

The control unit 81 is intended to perform various controls for the engine 10, the lubrication adjustment unit 85, the engagement adjustment unit 86, the gear shifter 84 and the like and includes a CPU, a ROM, a RAM, an input port, an output port and the like, which are well known. In order to perform these various controls, sensor values of various sensors (91 to 95) are inputted to the control unit 81.

Also, the control unit 81 includes, as partial functional elements, a hydraulic pressure control unit 82 and a shifting control unit 83 which is an example of gear changing control means and lubrication control means. In the present embodiment, the functional elements are described as being contained in the control unit 81, which is a unitary hardware, but some thereof may be provided in separate hardware.

The hydraulic pressure control unit 82 is configured to output a control signal, which is used to adjust an amount of a hydraulic oil (lubrication amount: for example, a flow rate per unit time) to be supplied to the first space 21A and the second space 22A, to the lubrication adjustment unit 85 depending on an instruction of the shifting control unit 83. Also, the hydraulic pressure control unit 82 is configured to output a control signal, which is used to adjust an amount of the hydraulic oil to be supplied to the first hydraulic pressure chamber 26A of the first clutch 21 and the second hydraulic pressure chamber 29A of the second clutch 22A, to the engagement adjustment unit 86 depending on an instruction of the shifting control unit 83.

The shifting control unit 83 is configured to determine whether shifting is required on the basis of information, such as an accelerator opening rate from the accelerator opening rate sensor 95 and a vehicle speed from the vehicle speed sensor 94. Also, if shifting is required, the shifting control unit 83 is configured to determine whether the shifting is performed by only clutch switching or additionally involves changing (gear shift) of a shift gear (in the present embodiment, the shift main gears (51 to 56)). Whether or not the shifting additionally involves changing of a shift gear can be grasped from whether a shift main gear being shifted to has been already engaged with a corresponding subsidiary shaft (34 or 35), after which of the shift main gears is engaged with the first subsidiary shaft 34 and which of the shift main gears is engaged with the second subsidiary shaft 35 have been previously grasped from states of the first to fourth synchro mechanisms 61 to 64.

If the shifting is performed by only clutch switching, the shifting control unit 83 instructs the hydraulic pressure control unit 82 to perform clutch switching.

In addition, if the shifting additionally involves changing of a shift gear, the shifting control unit 83 instructs the gear shifter 84 to change a shift gear (to gear disconnect a current sifting main gear and to gear connect a shift main gear being shifted to). Further, if a predetermined condition (increasing condition), under which a lubrication amount of the hydraulic oil to be supplied to the first space 21A and the second space 22A has to be increased, is satisfied, the shifting control unit 83 instructs the hydraulic pressure control unit 82 to increase a lubrication amount to be supplied to the first space 21A and the second space 22A after gear disconnecting the shift gear is completed, so that the lubrication amount becomes a predetermined maximum lubrication amount (an example of a second lubrication amount).

Herein, the increasing condition is set to at least one of a case where the number of revolutions of an input shaft connected to a to-be-engaged clutch is higher than the number of revolutions of the engine 10 when upshifting is performed, and a case where the number of revolutions of an input shaft connected to a to-be-engaged clutch is lower than the number of revolutions of the engine 10 when downshifting is performed.

Whether or not the number of revolutions of an input shaft connected to the to-be-engaged clutch is higher than the number of revolutions of the engine 10 and whether or not the number of revolutions of an input shaft connected to a to-be-engaged clutch is lower than the number of revolutions of the engine 10 may be directly determined from sensor values from the engine revolution number sensor 91, the first input shaft revolution number sensor 92 and the second input shaft revolution number sensor 93, and also may be determined from a relationship between a shift main gear before shifting, and a shift main gear before changing which has been engaged with a subsidiary shaft to which a shift main gear being shifted to is to be engaged. As specific examples of the latter, when shifting is performed from the 2nd stage to the 3rd stage, it can be determined that the number of revolutions of the first input shaft 31 (corresponding to the number of revolutions of the engine 10) is higher than the number of revolutions of the second input shaft 32, if the 5th stage main gear 55 (the shift main gear before changing) corresponding to the 5th stage, which is a higher speed stage than the 2nd stage before shifting, has been engaged with the first subsidiary shaft 34 to which the 3rd stage main gear 53 being shifted to is to be engaged. On the other hand, if the 1st stage main gear 51 corresponding to the 1st stage, which is a lower speed stage than the 2nd stage before shifting, has been engaged with the first subsidiary shaft 34 to which the 3rd stage main gear 53 being shifted to is to be engaged, it can be determined that the number of revolutions of the first input shaft 31 (corresponding to the number of revolutions of the engine 10) is lower than the number of revolutions of the second input shaft 32.

After the increasing condition is satisfied and thus the shifting control unit 83 instructs the hydraulic pressure control unit 82 to increase a lubrication amount, which is to be supplied to the first space 21A and the second space 22A, to the maximum lubrication amount, the shifting control unit 83 instructs the hydraulic pressure control unit 82 to cause the lubrication amount, which is to be supplied to the first space 21A and the second space 22A, to become a predetermined minimum lubrication amount (an example of a first lubrication amount), if the number of revolutions of an input shaft connected to a to-be-engaged clutch, which is detected by the first input shaft revolution number sensor 92 or the second input shaft revolution number sensor 93, is equal to the number of revolutions of the engine 10 detected by the engine revolution number sensor 91.

Thereafter, if gear connecting of the shift main gear being shifted to is completed, the shifting control unit 83 instructs the hydraulic pressure control unit 82 to cause the lubrication amount, which is to be supplied to the first space 21A and the second space 22A, to become the maximum lubrication amount. Also, if a predetermined period of time passes after the gear connecting is completed, the shifting control unit 83 instructs the hydraulic pressure control unit 82 to cause the lubrication amount of the hydraulic oil, which is to be supplied to the first space 21A and the second space 22A, to become the minimum lubrication amount, since the clutch has been already sufficiently cooled and thus merits of maximizing a cooling effect is reduced.

The gear shifter 84 is configured to operate the first to fourth synchro mechanisms 61 to 64 depending on an instruction of the shifting control unit 83, thereby causing the subsidiary shafts (the first subsidiary shaft 34 and the second subsidiary shaft 35) and the shift main gears (51 to 56) to be disengaged (gear disconnected) from each other or causing the subsidiary shafts (the first subsidiary shaft 34 and the second subsidiary shaft 35) and the shift main gears (51 to 56) to be engaged (gear connected) with each other.

The lubrication adjustment unit 85 is configured to adjust a lubrication amount of the hydraulic oil to be supplied to the first space 21A and the second space 22A, by adjusting the hydraulic oil from a hydraulic oil supply source (not shown) depending on a control signal supplied to the hydraulic pressure control unit 82.

The engagement adjustment unit 86 has, for example, a linear solenoid valve and is configured to adjust an amount and pressure of a hydraulic oil to be supplied to the first hydraulic pressure chamber 26A and an amount and pressure of a hydraulic oil to be supplied to the second hydraulic pressure chamber 29A, by adjusting the hydraulic oil from a hydraulic oil supply source (not shown) depending on a control signal supplied to the hydraulic pressure control unit 82. Switching between engaged and disengaged states of the first clutch 21 and switching between engaged and disengaged states of the second clutch 22 are performed by the hydraulic oil outputted from the engagement adjustment unit 86.

Next, a shifting control process by the shifting control device 80 will be described.

Figure 2:
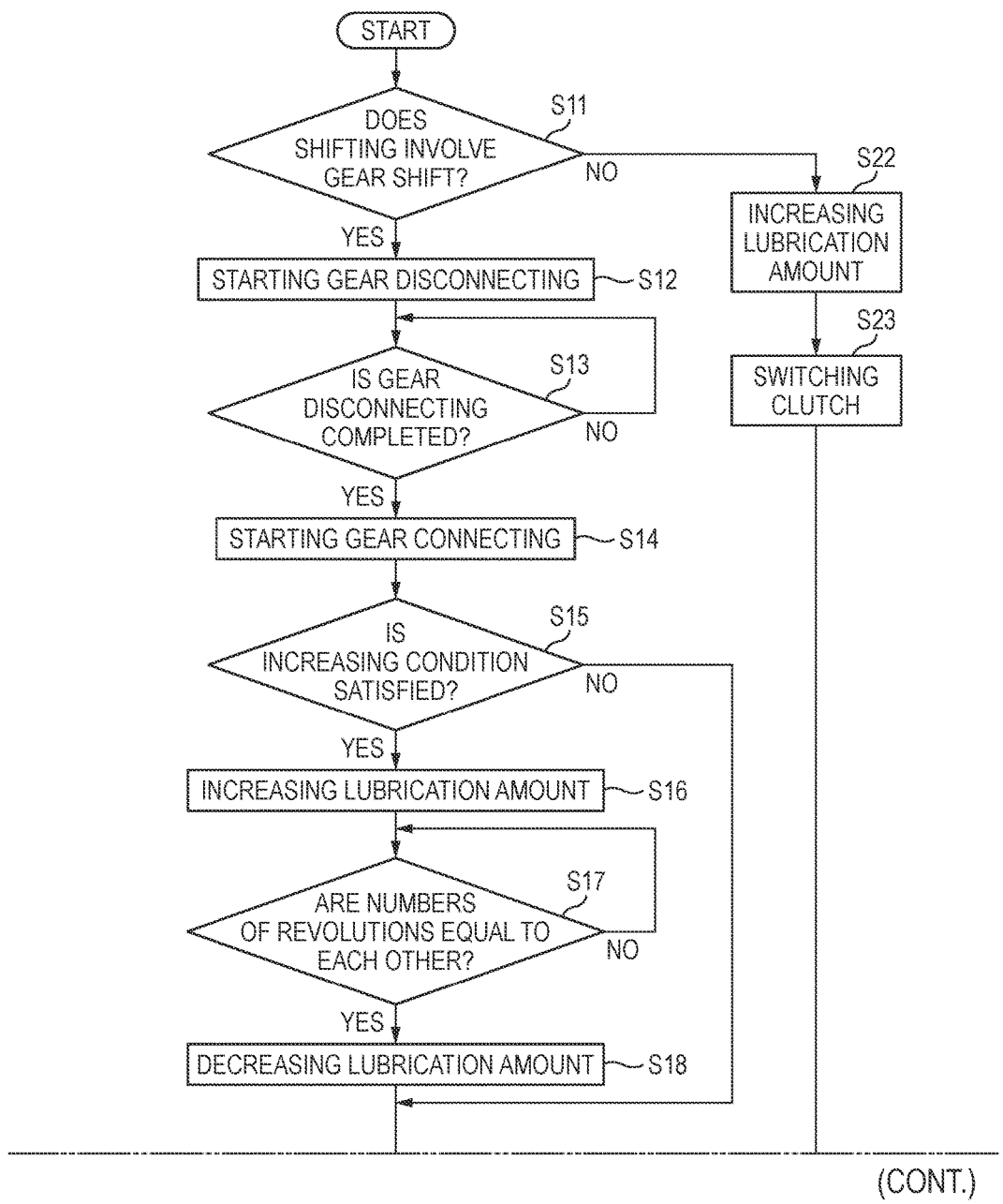
FIG. 2 is a flow chart showing a shifting control process according to one embodiment of the present disclosure.

FIG. 2 is a flow chart showing a shifting control process according to one embodiment of the present disclosure.

The shifting control process is performed in a case where the shifting control unit 83 determines that shifting is required.

The shifting control unit 83 determines whether or not the shifting involves gear changing (gear shift) (S11). As a result, if the shifting does not involve gear changing (S11: NO), the shifting control unit 83 instructs the hydraulic pressure control unit 82 to increase a lubrication amount, which is to be supplied to the first space 21A and the second space 22A, to the predetermined maximum lubrication amount (S22). Also, the shifting control unit 83 controls the engagement adjustment unit 86 using the hydraulic pressure control unit 82 in such a manner that a clutch (to-be-disengaged clutch), which is currently in an engaged state and thus has to be disengaged, becomes the disengaged state and also a to-be-engaged clutch becomes the engaged state, thereby switching the clutch to be coupled to the output shaft 11 of the engine 10 (Step S23). Then, the process is ended.

On the other hand, if the shifting involves gear changing (S11: YES), the shifting control unit 83 controls the gear shifter 84 to start to gear disconnect a current shift main gear (shift main gear being changed from), which has been engaged with a subsidiary shaft (the first subsidiary shaft 34 or the second subsidiary shaft 35) constituting a transmission line via the to-be-engaged clutch (S12).

Subsequently, the shifting control unit 83 determines whether or not gear disconnecting the shift main gear being changed from is completed (S13), and then if the gear disconnecting is not completed (S13: NO), the shifting control unit 83 performs the step S13 again.

On the other hand, if the gear disconnecting is completed (S13: YES), the shifting control unit 83 controls the gear shifter 84 to start gear connecting of a shift main gear being shifted to (S14).

Subsequently, the shifting control unit 83 determines whether or not the increasing condition, under which a lubrication amount of the hydraulic oil to be supplied to the first space 21A and the second space 22A has to be increased, is satisfied (S15). As a result, if the increasing condition is not satisfied (S15: NO), the shifting control unit 83 causes the process to proceed to a step S19.

On the other hand, if the increasing condition is satisfied (S15: YES), the shifting control unit 83 instructs the hydraulic pressure control unit 82 to increase the lubrication amount, which is to be supplied to the first space 21A and the second space 22A, to the maximum lubrication amount (S16). Therefore, the lubrication amount to be supplied to the first space 21A and the second space 22A becomes the maximum lubrication amount.

In this state, the to-be-disengaged clutch is in the engaged state and thus is rotated by the engine 10. On the other hand, the to-be-engaged clutch is in the disengaged state, and thus a subsidiary shaft coupled to an input shaft, which is connected to the to-be-engaged clutch, is not engaged with any shift main gears. Therefore, the to-be-engaged clutch is in a rotating state (idle state) while a driving power from the output shaft 11 of the engine 10 or a driving power from the output shaft 33 is not directly transmitted therethrough.

The hydraulic oil supplied to the first space 21A and the second space 22A is flowed due to an influence of rotation of the to-be-disengaged clutch rotated by the engine 10, and in turn the hydraulic oil influences rotation of the to-be-engaged clutch, which is in the idle state. That is, the hydraulic oil acts on the number of revolutions of the to-be-engaged clutch to approach the number of revolutions of the to-be-disengaged clutch (corresponding to the number of revolutions of the engine). More specifically, if the number of revolutions of the to-be-engaged clutch is higher than the number of revolutions of the to-be-disengaged clutch, the hydraulic oil acts to decrease the number of revolutions of the to-be-engaged clutch, whereas if the number of revolutions of the to-be-engaged clutch is lower than the number of revolutions of the to-be-disengaged clutch, the hydraulic oil acts to increase the number of revolutions of the to-be-engaged clutch. The influence of this action is increased as the lubrication amount of the hydraulic oil is increased.

If the increasing condition that the number of revolutions of an input shaft connected to a to-be-engaged clutch is higher than the number of revolutions of the engine 10 when upshifting is performed is satisfied, the hydraulic oil decreases the number of revolutions of the input shaft connected to the to-be-engaged clutch, so that the shift main gear being shifted to, to which rotation of the input shaft has to be transmitted, is decreased, thereby reducing a difference in the number of revolutions between the shift main gear and a subsidiary shaft to which the shift main gear is to be engaged. Therefore, it is possible to reduce a load in synchronizing operation of a synchro mechanism when the shift main gear is engaged with the subsidiary gear and also to shorten a time required for engaging the shift main gear with the subsidiary gear. That is, the hydraulic oil with an increased lubrication amount can effectively assist operation of the synchro mechanism.

Also, if the increasing condition that the number of revolutions of an input shaft connected to a to-be-engaged clutch is lower than the number of revolutions of the engine 10 when downshifting is performed is satisfied, the hydraulic oil increases the number of revolutions of the input shaft connected to the to-be-engaged clutch, so that the number of revolutions of the shift main gear being shifted to, to which rotation of the input shaft is to be transmitted, is increased, thereby reducing a difference in the number of revolutions between the shift main gear and a subsidiary shaft to which the shift main gear is to be engaged. Therefore, it is possible to reduce a load in synchronizing operation of a synchro mechanism when the shift main gear is engaged with the subsidiary gear and also to shorten a time required for engaging the shift main gear with the subsidiary gear. That is, the hydraulic oil with an increased lubrication amount can effectively assist operation of the synchro mechanism.

Subsequently, the shifting control unit 83 determines whether or not the number of revolutions of the input shaft connected to the to-be-engaged clutch is equal to the number of revolutions of the engine 10 detected by the engine revolution number sensor 91 (S17). As a result, if the number of revolutions of the input shaft is not equal to the number of revolutions of the engine 10 (S17: NO), the shifting control unit 83 performs the step S17 again.

On the other hand, if the number of revolutions of the input shaft is equal to the number of revolutions of the engine 10 (S17: YES), then an influence of the hydraulic oil on the to-be-engaged clutch is applied in a direction disturbing the synchronizing operation of the synchro mechanism, i.e., in a direction increasing a difference in the number of revolutions between the shift main gear being shifted to and the subsidiary gear engaged therewith. Therefore, in order to reduce the influence of the hydraulic oil, the shifting control unit 83 controls the hydraulic pressure control unit 82 to decrease the lubrication amount, which is to be supplied to the first space 21A and the second space 22A, to the minimum lubrication amount (S18).

Subsequently, the shifting control unit 83 determines whether or not the gear connecting of the shift main gear being shifted to is completed (S19), and then if the gear connecting is not completed (S19: NO), the shifting control unit 83 performs the step S19 again.

On the other hand, if the gear connecting is completed (S19: YES), the shifting control unit 83 controls the hydraulic pressure control unit 82 to cause the lubrication amount, which is to be supplied to the first space 21A and the second space 22A, to become the maximum lubrication amount (S20). In addition, the shifting control unit 83 controls the engagement adjustment unit 86 using the hydraulic pressure control unit 82 in such a manner that the to-be-disengaged clutch becomes the disengaged state and also the to-be-engaged clutch becomes the engaged state, thereby switching the clutch to be coupled to the output shaft 11 of the engine 10 (Step S21). Then, the process is ended. Meanwhile, if a predetermined period of time, at which cooling by the maximum lubrication amount is not required, passes after the gear connecting is completed, the shifting control unit 83 controls the hydraulic pressure control unit 82 to cause the lubrication amount, which is to be supplied to the first space 21A and the second space 22A, to become the minimum lubrication amount.

Next, various state changes when shifting of the dual-clutch transmission 1 according to the present embodiment is performed will be described.

In FIG. 3, (a) is a view showing a change in the number of revolutions of the input shaft and the number of revolutions of the engine when upshifting is performed; (b) is a view showing a change in shift stroke; (c) is a view showing a change in amount of hydraulic oil (lubrication amount) supplied to a space around clutch plates; and (d) is a view showing a change in the number of revolutions of the input shaft and the number of revolutions of the engine when downshifting is performed.

As a case of upshifting involving gear changing, for example, a case where shifting is performed from the 2nd stage to the 3rd stage will be described by way of example with reference to (a), (b) and (c) of FIG. 3. Meanwhile, it will be described that the first subsidiary shaft 34 capable of being coupled with the first clutch 21, which is a to-be-engaged clutch, has been engaged with the 1st stage main gear 51 at a time T0.

At the time T0 before upshifting is started, the second clutch 22, which is a to-be-disengaged clutch, is in an engaged state, and hence the number of revolutions of the engine and the number of revolutions of the second input shaft 32 connected to the second clutch 22 (the number of revolutions on the to-be-disengaged side) are the same. On the other hand, since the first subsidiary shaft 34 is engaged with the 1st stage main gear 51, which has a speed lower than that of the 2nd stage, the number of revolutions of the first input shaft 31 connected to the first clutch 21, which is the to-be-engaged clutch, (the number of revolutions on the to-be-engaged side) is higher than the number of revolutions on the to-be-disengaged side.

At the time T0, a gear being changed from (a gear engaged with the first subsidiary shaft 34, and thus herein the 1st stage main gear 51) is in a gear connected state as shown in (b) of FIG. 3. Also, a lubrication amount of the hydraulic oil to be supplied to the first space 21A and the second space 22A by the hydraulic pressure control unit 82 is set to the minimum lubrication amount as shown in (c) of FIG. 3.

Subsequently, if at a time T2, the shifting control unit 83 determines that upshifting from the 2nd stage to the 3rd stage involving gear changing is required, the shifting control unit 83 starts to move a sleeve (not shown) of the first synchro mechanism 61 using the gear shifter 84, thereby starting gear disconnecting the 1st stage main gear 51.

Thus, as shown by a solid line in (b) of FIG. 3, a stroke (shift stroke) of the sleeve (not shown) of the first synchro mechanism 61 is moved from a gear connecting position shown at the time T2 in a direction of a neutral position and then assumes the neutral position once the gear disconnecting is completed (Time T3).

At the time T3, since the gear disconnecting has been completed, the shifting control unit 83 controls the gear shifter 84 to start to move a sleeve (not shown) of the third synchro mechanism 63, thereby starting to gear connect a shift main gear being shifted to (3rd stage main gear 53) as shown by a broken line in (b) of FIG. 3.

Once the gear connecting is started at the time T3, synchronizing between the first subsidiary shaft 34 (the sleeve of the third synchro mechanism 63) and the 3rd stage main gear 53 is started by the third synchro mechanism 63. Thus, after the time T3, the number of revolutions of the first input shaft 31 (the number of revolutions on the to-be-engaged side) is gradually decreased to be synchronized with the number of revolutions of the output shaft 33.

Also, once the gear connecting is started at the time T3, the shifting control unit 83 controls the lubrication adjustment unit 85 using the hydraulic pressure control unit 82, thereby increasing a lubrication amount, which is to be supplied to the first space 21A and the second space 22A, to the maximum lubrication amount as shown in (c) of FIG. 3. Therefore, the hydraulic oil flowing due to an influence of rotation of the to-be-disengaged clutch (second clutch 22) decreases the number of revolutions of the to-be-engaged clutch (first clutch 21), i.e., the number of revolutions of the first input shaft 31 connected to the first clutch 21. As a result, the number of revolutions of the 3rd stage main gear 53 as a shift main gear being shifted to, to which rotation of the first input shaft 31 has to be transmitted, is decreased, thereby reducing a difference in the number of revolutions between the 3rd stage main gear 53 and the first subsidiary shaft 34, with which the 3rd stage main gear 53 has to be engaged. Thus, since the hydraulic oil having the maximum lubrication amount properly acts in a direction assisting the synchronizing operation by the third synchro mechanism 63, it is possible to properly reduce a load exerted on the third synchro mechanism 63 and also to shorten a time required for synchronizing.

Thereafter, if, as shown in (a) of FIG. 3, the number of revolutions on the to-be-engaged side becomes equal to the number of revolutions of the engine (Time T4), the shifting control unit 83 controls the lubrication adjustment unit 85 using the hydraulic pressure control unit 82, in such a manner as to decrease a lubrication amount, which is to be supplied to the first space 21A and the second space 22A, to the minimum lubrication amount.

Then, if synchronizing between the first subsidiary shaft 34 (the sleeve of the third synchro mechanism 63) and the 3rd stage main gear 53 is completed (Time T5), as shown in (b) of FIG. 3, the third synchro mechanism 63 moves the sleeve to a position where the sleeve is coupled with a dog gear of the 3rd stage main gear 53, thereby completing the engaging (Time T6).

Once the engaging of the 3rd stage main gear 53 is completed, the shifting control unit 83 controls the lubrication adjustment unit 85 using the hydraulic pressure control unit 82, in such a manner as to increase the lubrication amount, which is to be supplied to the first space 21A and the second space 22A, to the maximum lubrication amount (Time T6).

Also, the shifting control unit 83 controls the engagement adjustment unit 86 using the hydraulic pressure control unit 82 in such a manner that the to-be-disengaged clutch becomes the disengaged state and also the to-be-engaged clutch becomes the engaged state, thereby switching the clutch to be coupled to the output shaft 11 of the engine 10. Therefore, as shown in (a) of FIG. 3, after the time T6, the first clutch 21 becomes a half clutch state and then a difference between the number of revolutions on the to-be-engaged side and the number of revolutions of the engine is gradually reduced, and then at a time T7, the number of revolutions on the to-be-engaged side becomes equal to the number of revolutions of the engine, so that the first clutch 21 becomes a fully engaged state.

Next, as a case of downshifting involving gear changing, for example, a case where shifting is performed from the 3rd stage to the 2nd stage will be described by way of example with reference to (b), (c) and (d) of FIG. 3. Meanwhile, for the sake of convenience, (b) and (c) of FIG. 3 are used for illustrating the case of downshifting as well as the case of upshifting as described above. However, times T0 to T8 in the figures are not necessarily the same between the case of downshifting and the case of upshifting. Also, it will be described that the second subsidiary shaft 35 capable of being coupled with the second clutch 22, which is a to-be-engaged clutch, has been engaged with the 4th stage main gear 54 at a time T0.

At the time T0 before downshifting is started, the first clutch 21, which is a to-be-disengaged clutch, is in an engaged state, and hence as shown in (d) of FIG. 3, the number of revolutions of the engine and the number of revolutions of the first input shaft 31 connected to the first clutch 21 (the number of revolutions on the to-be-disengaged side) are the same. On the other hand, since the second subsidiary shaft 35 is engaged with the 4th stage main gear 54, which has a speed higher than that of the 3rd stage, the number of revolutions of the second input shaft 32 connected to the second clutch 22, which is the to-be-engaged clutch, (the number of revolutions on the to-be-engaged side) is lower than the number of revolutions on the to-be-disengaged side.

At the time T0, as shown in (b) of FIG. 3, a gear being changed from (a gear engaged with the second subsidiary shaft 35, and thus herein the 4th stage main gear 54) is in a gear connected state. Also, a lubrication amount of the hydraulic oil to be supplied to the first space 21A and the second space 22A by the hydraulic pressure control unit 82 is set to the minimum lubrication amount as shown in (c) of FIG. 3.

Subsequently, if at a time T2, the shifting control unit 83 determines that downshifting from the 3rd stage to the 2nd stage additionally involving gear changing is required, the shifting control unit 83 starts to move a sleeve (not shown) of the second synchro mechanism 62 using the gear shifter 84, thereby starting to gear disconnect the 4th stage main gear 54.

Thus, as shown by a solid line in (b) of FIG. 3, a stroke (shift stroke) of the sleeve (not shown) of the second synchro mechanism 62 is moved from a gear connecting position shown at the time T2 in a direction of a neutral position and then assumes the neutral position once the gear disconnecting is completed (Time T3).

At the time T3, since the gear disconnecting has been completed, the shifting control unit 83 controls the gear shifter 84 to start to move the sleeve (not shown) of the second synchro mechanism 62, thereby starting to gear connect a shift main gear being shifted to (2nd stage main gear 52). Herein, according to the present example, the same synchro mechanism takes responsibility for the gear being changed from and the gear to be changed to. Therefore, after the time T3, a broken line representing a gear shift being changed to also represents a stroke of the second synchro mechanism 62.

Once the gear connecting is started at the time T3, synchronizing between the second subsidiary shaft 35 (the sleeve of the second synchro mechanism 62) and the 2nd stage main gear 52 is started by the second synchro mechanism 62. Thus, after the time T3, the number of revolutions of the second input shaft 32 (the number of revolutions on the to-be-engaged side) is gradually increased to be synchronized with the number of revolutions of the output shaft 33.

Also, once the gear connecting is started at the time T3, the shifting control unit 83 controls the lubrication adjustment unit 85 using the hydraulic pressure control unit 82, thereby increasing a lubrication amount, which is to be supplied to the first space 21A and the second space 22A, to the maximum lubrication amount as shown in (c) of FIG. 3. Therefore, the hydraulic oil flowing due to an influence of rotation of the to-be-disengaged clutch (first clutch 21) increases the number of revolutions of the to-be-engaged clutch (second clutch 22), i.e., the number of revolutions of the second input shaft 32 connected to the second clutch 22. As a result, the number of revolutions of the 2nd stage main gear 52 as a shift main gear being shifted to, to which rotation of the second input shaft 32 has to be transmitted, is increased, thereby reducing a difference in the number of revolutions between the 2nd stage main gear 52 and the second subsidiary shaft 35, with which the 2nd stage main gear 52 has to be engaged. Thus, since the hydraulic oil having the maximum lubrication amount properly acts in a direction assisting the synchronizing operation by the second synchro mechanism 62, it is possible to properly reduce a load exerted on the second synchro mechanism 62 and also to shorten a time required for synchronizing.

If, as shown in (d) of FIG. 3, the number of revolutions on the to-be-engaged side becomes equal to the number of revolutions of the engine (Time T4), the shifting control unit 83 controls the lubrication adjustment unit 85 using the hydraulic pressure control unit 82, in such a manner as to decrease a lubrication amount, which is to be supplied to the first space 21A and the second space 22A, to the minimum lubrication amount.

If synchronizing between the second subsidiary shaft 35 (the sleeve of the second synchro mechanism 62) and the 2nd stage main gear 52 is completed (Time T5), as shown in (b) of FIG. 3, the second synchro mechanism 62 moves the sleeve to a position where the sleeve is coupled with a dog gear of the 2nd stage main gear 52, thereby completing the gear connecting (Time T6).

Once the gear connecting of the 2nd stage main gear 52 is completed, the shifting control unit 83 controls the lubrication adjustment unit 85 using the hydraulic pressure control unit 82, in such a manner as to increase the lubrication amount, which is to be supplied to the first space 21A and the second space 22A, to the maximum lubrication amount (Time T6).

Also, the shifting control unit 83 controls the engagement adjustment unit 86 using the hydraulic pressure control unit 82 in such a manner that the to-be-disengaged clutch becomes the disengaged state and also the to-be-engaged clutch becomes the engaged state, thereby switching the clutch to be coupled to the output shaft 11 of the engine 10. Therefore, as shown in (d) of FIG. 3, after the time T6, the second clutch 22 first becomes a half clutch state, and then a difference between the number of revolutions on the to-be-engaged side and the number of revolutions of the engine is gradually reduced, and then at a time T7, the number of revolutions on the to-be-engaged side becomes equal to the number of revolutions of the engine, so that the second clutch 22 become a fully engaged state.

As set forth above, according to the shifting control device 80 of the present embodiment, in at least one of a case of upshifting involving switching of clutches and changing of shift gears used in a transmission line being switched to, in which the number of revolutions of an input shaft connected to a to-be-engaged clutch before upshifting is higher than the number of revolutions of the engine, or a case of downshifting involving switching of clutches and changing of shift gears used in a transmission line being switched to, in which the number of revolutions of an input shaft connected to a to-be-engaged clutch before downshifting is lower than the number of revolutions of the engine, an amount of the hydraulic oil to be supplied to the first space 21A and the second space 22A is increased to the maximum lubrication amount during a period of time from a time when gear disconnecting of a shift gear before being changed is completed until the number of revolutions of the input shaft becomes equal to the number of revolutions of the engine. Therefore, it is possible to properly reduce a load exerted on a corresponding synchro mechanism and also to shorten a time required for synchronizing.

Meanwhile, the present disclosure is not limited to the foregoing embodiments, and accordingly, appropriate changes can be made thereto without departing from the spirit and scope of the present disclosure.

For example, although in the foregoing embodiments, the amount of the hydraulic oil to be supplied to the first space 21A and the second space 22A is increased to the maximum lubrication amount during a period of time from the time when gear disconnecting is completed until the number of revolutions of the input shaft connected to the to-be-engaged clutch becomes equal to the number of revolutions of the engine 10, the present disclosure is not limited thereto. The amount of the hydraulic oil may not be the maximum lubrication amount, and thus in short, the amount may be any amount as long as it is larger than the minimum lubrication amount. Further, although in the foregoing embodiments, a period of time, during which the hydraulic oil is increased, is from when gear disconnecting is completed until the number of revolutions of an input shaft connected to the to-be-engaged clutch becomes equal to the number of revolutions of the engine 10, the present disclosure is not limited thereto. The period of time may be set to at least a part of a period of time from when gear disconnecting is completed until the number of revolutions of an input shaft connected to the to-be-engaged clutch becomes equal to the number of revolutions of the engine 10.

This application is based on Japanese Patent Application No. 2015-231067 filed on Nov. 26, 2015, the entire contents of which are incorporated herein by reference.

INDUSTRIAL APPLICABILITY

The control device for the dual-clutch transmission according to the present disclosure is useful in that a hydraulic oil used for cooling clutch plates can be used more profitably.

REFERENCE SIGNS LIST

1: Dual-clutch transmission
10: Engine
11: Output shaft
20: Dual-clutch device
21: First clutch
21A: First space
22: Second clutch
22A: Second space
26, 29: Piston
26A: First hydraulic pressure chamber 29A: Second hydraulic pressure chamber
30: Transmission mechanism
31: First input shaft
32: Second input shaft
33: Output shaft
34: First subsidiary shaft
35: Second subsidiary shaft
41: 1st stage input gear
42: 2nd stage input gear
43: 3rd stage input gear
44: 4th stage input gear
45: 5th stage input gear
46: 6th stage input gear
51: 1st stage main gear
52: 2nd stage main gear
53: 3rd stage main gear
54: 4th stage main gear
55: 5th stage main gear
56: 6th stage main gear
61: First synchro mechanism
62: Second synchro mechanism
63: Third synchro mechanism
64: Fourth synchro mechanism
80: Shifting control device
81: Control unit
82: Hydraulic pressure control unit
83: Shifting control unit
84: Gear shifter
85: Lubrication adjustment unit
86: Engagement adjustment unit

The invention claimed is:

1. A control device for a dual-clutch transmission in which a clutch device including a first clutch and a second clutch is provided between a driving source and a transmission mechanism, a driving power transmission path from the driving source to a vehicle drive system is capable of being switched between a first transmission line via the first clutch and a second transmission line via the second clutch, and shift gears usable in the first transmission line are different from shift gears usable in the second transmission line,
wherein a first space, which is provided around first clutch plates for engaging and disengaging the first clutch, and a second space, which is provided around second clutch plates for engaging and disengaging the second clutch, are communicated with each other and are configured to allow a hydraulic oil for cooling to be supplied thereto, the control device comprising a controller configured to:
when shifting which involves switching between the first transmission line and the second transmission line and changing of shift gears used in a switching transmission line being switched to is performed, perform changing of the shift gear used in the switching transmission line being switched to, if a clutch of a switching transmission line being switched from is in an engaged state and also a clutch of the switching transmission line being switched to is in a disengaged state; and
in at least one of: (i) a case where, when upshifting which involves switching between the first transmission line and the second transmission line and changing of the shift gear used in the switching transmission line being switched to is performed, a number of revolutions of an input shaft connected to a to-be-engaged clutch, which is the clutch of the switching transmission line being switched to, is higher than a number of revolutions of the driving source before the upshifting is performed; or (ii) a case where, when downshifting which involves the switching between the first transmission line and the second transmission line and the changing of the shift gear used in the switching transmission line being switched to is performed, the number of revolutions of the input shaft connected to the to-be-engaged clutch is lower than the number of revolutions of the driving source before the downshifting is performed, increase an amount of the hydraulic oil, which is to be supplied to the first space and the second space, to a second lubrication amount larger than a predetermined first lubrication amount during at least a part of a period of time from when gear disconnecting of a shift gear before being changed is completed until the number of revolutions of the input shaft becomes equal to the number of revolutions of the driving source.

2. The control device for the dual-clutch transmission according to claim 1,
wherein the controller is configured to adjust the amount of the hydraulic oil, which is to be supplied to the first space and the second space, to the first lubrication amount during a period of time from when the number of revolutions of the input shaft becomes equal to the number of revolutions of the driving source until gear connecting of a shift gear being changed to is completed.

3. The control device for the dual-clutch transmission according to claim 1,
wherein in at least one of: (i) the case where, when the upshifting which involves switching between the first transmission line and the second transmission line and changing of the shift gear used in the switching transmission line being switched to is performed, the number of revolutions of the input shaft connected to the to-be-engaged clutch, which is the clutch of the switching transmission line being switched to, is higher than the number of revolutions of the driving source before the upshifting is performed, or (ii) the case where, when the downshifting which involves the switching between the first transmission line and the second transmission line and the changing of the shift gear used in the switching transmission line being switched to is performed, the number of revolutions of the input shaft connected to the to-be-engaged clutch is lower than the number of revolutions of the driving source before the downshifting is performed, the controller is configured to increase the amount of the hydraulic oil, which is to be supplied to the first space and the second space, to the second lubrication amount during the period of time from when the gear disconnecting of the shift gear before being changed is completed until the number of revolutions of the input shaft becomes equal to the number of revolutions of the driving source.

4. The control device for the dual-clutch transmission according to claim 1,
wherein when the gear connecting of the shift gear being changed to is completed, the controller is configured to adjust the amount of the hydraulic oil, which is to be supplied to the first space and the second space, to a maximum lubrication amount.

5. The control device for the dual-clutch transmission according to claim 1,
wherein the first lubrication amount is a minimum lubrication amount to be supplied to the first space and the second space, and the second lubrication amount is a maximum lubrication amount to be supplied to the first space and the second space.

* * * * *